UNITED STATES PATENT OFFICE.

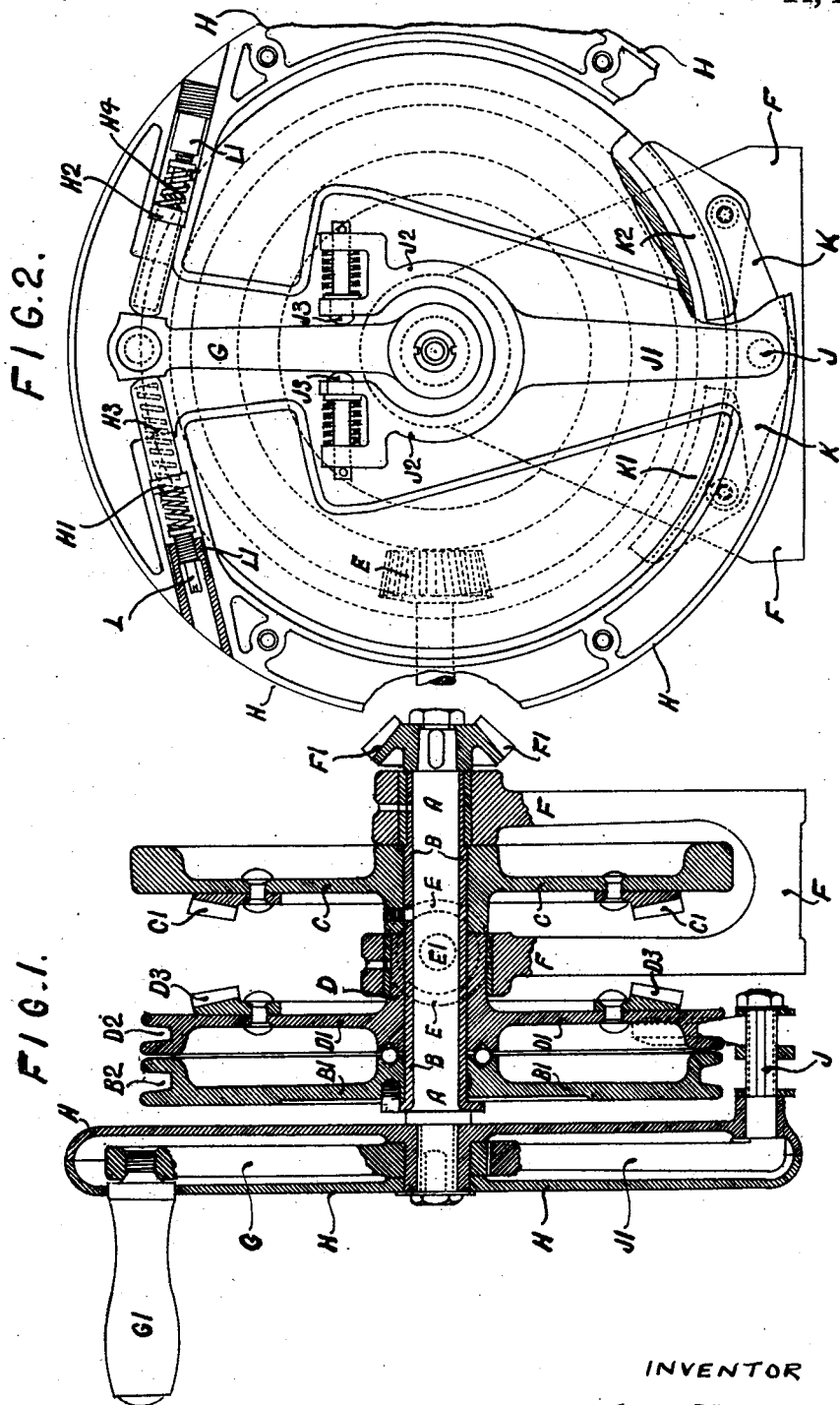

AXEL BREMBERG, OF GLASGOW, SCOTLAND.

MECHANISM FOR TRANSMITTING HAND AND MOTOR POWER.

1,409,821. Specification of Letters Patent. Patented Mar. 14, 1922.

Application filed July 16, 1920. Serial No. 396,813.

(GRANTED UNDER THE PROVISIONS OF THE ACT OF MARCH 3, 1921, 41 STAT. L.. 1313.)

*To all whom it may concern:*

Be it known that I, AXEL BREMBERG, a subject of the King of Great Britain and Ireland, and a resident of Glasgow, Scotland, have invented a certain new and useful Improved Mechanism for Transmitting Hand and Motor Power, (for which I have filed an application in England Mar. 11, 1919, Patent No. 138,461,) and of which the following is the specification.

The invention relates to mechanism for transmitting hand and motor power in which the latter is brought into play to assist the former, when the resistance to the manual operation of the apparatus exceeds a predetermined amount, and the invention has for its object to provide improved mechanism of this type.

The improved mechanism comprises essentially a spindle operatively connected to the apparatus to be operated. On this spindle there are loosely mounted two coaxial discs so geared that they may be rotated by power in opposite directions. The spindle is operated by a handle through resilient devices, which permit of the handle moving relatively to the spindle, when the resistance to the manual operation of the apparatus exceeds predetermined amount. Mechanical clutch members are operatively connected to this handle and are adapted, on movement of the latter relative to the spindle, to clutch one or other of the coaxial discs to the spindle, and so call into play the assistance of motor power to manipulate the apparatus in either direction.

The improvements are more particularly applicable for use in connection with elevating and traversing gear for ordnance especially of large calibre.

In order that the invention and the manner of performing the same may be properly understood, an example of the improved mechanism is shown on an accompanying sheet of explanatory drawings, Figure 1 being a sectional side, and Figure 2 a sectional end elevation.

In carrying out the invention, there is provided on a spindle A a loose sleeve B having fast on it a disc $B^1$ in the periphery of which is a groove $B^2$. Rigid with the sleeve B is a second disc C having fixed to it a ring $C^1$ of bevel teeth. On the sleeve B is a second free sleeve D bearing a disc $D^1$ having in its periphery a groove $D^2$ and also carrying a bevel ring $D^3$. With the bevel rings $C^1$, $D^3$ there engages a pinion E on a shaft $E^1$ driven from any convenient source of power. Spindle and sleeves are supported in a bracket F, and the spindle is provided with a bevel pinion $F^1$ for the transmission of power from it.

Loosely mounted on the end of the spindle A is a hand lever G gearing a handle $G^1$. The hand lever is enclosed in a casing H fast on the spindle A and is held in a mid position therein by two pistons $H^1$, $H^2$, controlled by springs $H^3$, $H^4$, which pistons are mounted tangentially in the casing and bear against seats on the end of the hand lever.

There is pivoted on a spindle J within the casing H a lever $J^1$ having a jaw $J^2$ embracing the hand lever and provided with two spring-controlled tappets $J^3$ which engage the latter and prevent lost motion.

Fast on the spindle J is a two armed lever K carrying on the extremities of its arms V-faced clutch blocks $K^1$, $K^2$, engaging respectively the groove $B^2$ and the groove $D^2$ in the discs $B^1$, $D^1$.

The compression of the springs $H^3$, $H^4$, is adjustable by means of set pins L screwed in nipples $L^1$ in the casing H, and their compression is so adjusted that when the load is light and with the manual power of operation by the handle $G^1$, they do not permit of movement of the handle relatively to the casing H, and thus the spindle A is rotated by hand power alone. But when the determinate load on the handle is exceeded in either direction of rotation, one or other of the springs $H^3$, $H^4$, becomes further compressed, and the handle $G^1$ and hand lever G move relatively to the casing. In so moving, the lever G encounters one or other of the tappets $J^3$ and so moves the lever $J^1$ which in turn rocks the lever K and throws one or other of the clutch blocks $K^1$, $K^2$, into engagement with either the groove $B^2$ or the groove $D^2$. Thus one or other of the power-driven discs $B^1$, $D^1$, is clutched through the levers $J^1$, K, and spindle J to the casing H and handle and so to the spindle A which is thus operated or rather assisted in its operation by power—which power assistance continues so long as sufficient manual pressure is maintained on the handle $G^1$ to compress one or other spring $H^3$, $H^4$ and so through the levers $J^1$, K, keep one or other block $K^1$, $K^2$ in engagement with the groove of one or other disc $B^1$, $D^1$.

The operation of the device may be explained as follows: The discs $B^1$ and C are both fast upon the sleeve B and are constantly rotated as a single unit in one direction by the bevel pinion E, which also transmits a continus drive in the opposite direction to the disc $D^1$ formed integral with the second loose sleeve D. When the resistance to the manual operation of the handle exceeds a predetermined value, one or other of the clutch members $K^1$, $K^2$, are brought into engagement with the corresponding groove $B^2$ or $D^2$ and assistance from the power-driven shaft $E^1$ is thus called into play.

So long as the resistance to the turning of the shaft A is not sufficient to cause the handle $G^1$ to move relatively to the casing H, i. e., relative to the shaft A, the lever G, the casing H and the shaft A all rotate solid under manual operation of the handle $G^1$, and this rotation is quite independent of and irrespective of the discs $B^1$, C and $D^1$ which are constantly driven by the pinion E. When, and only when, the load on the shaft A reaches that value at which relative movement between the handle $G^1$ and the casing H takes place, is the assistance of the power-driven discs called into play.

The pinion $F^1$ is carried on the shaft A for the transmission of power from the latter, i. e., the pinion $F^1$ is in gear with a similar pinion (not shown) carried on a transverse shaft. This, of course, is only illustrative and forms no part of the invention; any suitable means of transmitting power from the shaft A may be employed.

What I claim is:—

1. In mechanism for the purposes set forth two coaxial discs driven in opposite directions by power and mounted loosely on a hand-operated spindle; a handle operating the spindle through resilient devices; and mechanical clutch members operatively connected to the handle and adapted on movement of the latter relative to the spindle, to clutch one or other of the coaxial discs to the spindle, as set forth.

2. In the mechanism forming the subject-matter of the foregoing claim hereof, an operating hand lever loosely mounted on the spindle, a casing fast on the spindle and embracing the hand lever; resilient means between hand lever and casing constraining relative movement of the former; and a lever operated by the hand lever on such movement taking place and then causing the application of clutch blocks to one or other of the power driven discs, as set forth.

In testimony whereof I have signed my name to this specification.

AXEL BREMBERG.